3,790,602
ACCELERATED PROCESS FOR DIARYL
SULFONE GLYCIDYL ETHERS
Claire Bluestein, Glen Rock, N.J., William Rosenblatt, Pearl River, N.Y., and John R. Clark, Nutley, N.J., assignors to Witco Chemical Corporation, New York, N.Y.
No Drawing. Filed Mar. 31, 1972, Ser. No. 239,986
Int. Cl. C07d 1/04
U.S. Cl. 260—348.6         5 Claims

ABSTRACT OF THE DISCLOSURE

An improved accelerated process for preparing glycidyl ethers of polyhydric phenols, particularly those polyhydric phenols which are substantially insoluble in epichlorohydrin, such as bis(4-hydroxyphenyl)sulfone (bisphenol-S), by refluxing a mixture of the polyhydric phenol in excess epichlorohydrin in the presence of a catalytic amount of an alkali metal salt of a weak carbon containing acid having from 1 to 4 carbon atoms, such as sodium or potassium formate or acetate, for instance, to accelerate the formation of the soluble adduct in epichlorohydrin. The resultant solution of the adduct of poyhydric phenol and epichlorohydrin in epichlorohydrin solution is treated with a stoichiometric excess of alkali metal hydroxide while refluxing, to form the glycidyl ether product which is useful in making films, castings, coatings, adhesives and the like.

---

This invention relates to an improved accelerated process for preparing glycidyl ethers of polyhydric phenols, particularly of epihalohydrin-insoluble polyhydric phenols, such as bis(4-hydroxyphenyl)sulfone, (bisphenol S), wherein a catalytic amount of an alkali metal salt of a weak carbon containing acid having 1 to about 4 carbon atoms is added to a suspension of the insoluble bisphenol S in excess epichlorohydrin for instance, to accelerate the formation of the epichlorohydrin soluble adduct of bisphenol S-epichlorohydrin. The solution of the adduct in epichlorohydrin is then treated with excess alkali metal hydroxide to produce bisphenol S glycidyl ethers, as known in the art, in good yield. The hydroxide may be in the form of powders, pellets, flakes, and generally any available commercial form.

Glycidyl ethers of polyhydric phenols may be prepared by various known methods, such as described in U.S. Pat. 2,765,322, issued to Beavers on Oct. 2, 1956, and U.S. Pat. 3,417,050, issued to Price et al., on Dec. 17, 1968. Both of these patents disclose polyhydric phenols which are soluble in epichlorohydrin and readily form the adduct of the polyhydric phenol and epichlorohydrin, which is converted to the corresponding glycidyl ether by treatment with caustic while refluxing. In the Beavers patent, the glycidyl ether is prepared by treating the adduct in epichlorohydrin solution with aqueous caustic, whereas in the Price et al. patent, the adduct in epichlorohydrin solution is treated with a dispersion of a finely divided alkali metal hydroxide in an inert organic suspending medium. The disclosures in each of the above patents are incorporated herein by reference.

Because glycidyl ethers of polyhydric phenols having low residual chlorine content have found commercial acceptance, the process in Price et al., which renders low chlorine containing products, offers a commercial advantage. However, when epichlorohydrin insaoluble polyhydric phenols, such as bis(4-hydroxyphenyl)sulfone, are utilized in the above procedure, long hours of refluxing are required before the epichlorohydrin soluble adduct is formed.

When preparing the adduct of bis(4-hydroxyphenyl)sulfone (bisphenol S), and epichlorohydrin, for instance, wherein about 3 or 4 mols of epichlorohydrin per phenolic hydroxyl equivalent is employed, complete solution i.e. adduct formation, is not achieved even after heating for over 8 hours. When higher proportions of epichlorohydrin are employed to accelerate adduct formation, even when utilizing as much as 10 mols per hydroxyl equivalent, the mixture must be refluxed for 5-6 hours before solution is achieved. The glycidyl ether product resulting from treatment of the long refluxed solution with excess alkali metal hydroxide, is a crude product and must be post-treated, such as reacting with additional caustic, recrystallization, or extraction, with concurrent large losses in yield in order to arrive at a commercially acceptable product having a low residual chlorine content.

A similar crude product is obtained when a slurry of bisphenol S in epichlorohydrin is refluxed while adding a slurry of alkali metal hydroxide in an inert solvent. The reaction is also slow and sluggish, even when the hydroxide is in a finely divided state, as in Price et al., supra.

According to the present invention, formation of the soluble adduct of an insoluble polyhydric phenol such as bisphenol S for instance, and epichlorohydrin, in excess epichlorohydrin is greatly accelerated by the addition of a catalytic amount of an alkali metal salt of a weak carbon containing acid having up to about 4 carbon atoms, such as the sodium or potassium salt of formic, acetic, propionic, oxalic, malonic, succinic acid, and the like. Quite unexpectedly the insoluble bisphenol S in the presence of an alkali metal salt of formic or acetic acid, for instance which are the preferred salts, forms a soluble adduct with epichlorohydrin by simple refluxing for as little as 10–20 minutes. This represents a gross improvement over the hours of refluxing required by prior art methods. The epichlorohydrin solution of the adduct is then treated with a slurry of alkali metal hydroxide powders, flakes, or pellets, for instance, while under reflux, to produce the desired bisphenol S glycidyl ether which precipitates from the cooled epichlorohydrin solution. This product is recovered in good yield and requires no further purification for use in making films, coatings and the like.

The hydroxide need not be in critical micron size, such as is disclosed in the above cited patent. It can be in any commercially available physical form. Good yields of a low chlorine content bisphenol S diglycidyl ether are realized by the present process without resorting to the tedious, hazardous and time consuming process of grinding the extremely hygroscopic alkali metal hydroxide into small micron particle size, as disclosed in the above patent, although this finely divided alkali metal hydroxide can also be employed to advantage in the present process.

The quantity of sodium formate or acetate, for instance, required to accelerate formation of the adduct, may vary from 0.05 to 4.0 wt. percent based on the weight of bisphenol S. about 0.15 to 0.25 wt. percent being preferred. Excesses, although ecomonically unwise, may be utilized without seriously interfering with the quality or yield of the product.

The molar ratios of polyhydric phenol to epichlorohydrin based on phenolic hydroxy equivalent, and the quantity of alkali metal hydroxide, as well as the reaction conditions including temperature, all remain substantially similar to those described in the above cited patents and as shown in the art.

By the accelerated process of the present invention, bisphenol S diglycidyl ether for instance, can be prepared in 70–80% yield, with a total residual chlorine, i.e. hydrolyzable chlorine, of about 0.05 to 0.5 weight percent, without extensive post treatments and in short order. Hydrolyzable chlorine is determined by a procedure according to Lee & Neville, Handbook for Epoxy Resins, McGraw-Hill, N.Y. (1967), ch. 4, pp. 29–30. The glycidyl ether product can be cured, as known in the art, with Nadic methyl anhydride or bisphenol A or S, for instance, to form useful films, castings, coatings, and adhesives.

Other halogenated epoxides such as methylepichlorohydrin, and epibromohydrin, for instance, can be effectively utilized in the present process to produce the respective diglycidyl ethers.

The present process is applicable in the preparation of other glycidyl ethers which are epichlorohydrin insoluble, such as 2,4-bis(hydroxyphenyl)sulfone, the bis(cresyl) and the bis(xylenol)sulfones, and mixtures of any and all of the above.

It is an advantage of the present invention that the epichlorohydrin solution of polyhydroxy phenol-epichlorohydrin adduct is stable and may be stored at ambient temperature for prolonged periods until ready for use.

The following examples are illustrative of specific aspects of the present invention and are not to be construed as being limited thereto.

EXAMPLE 1

750 g. of bis(4-hydroxyphenol)sulfone (3 mols) containing about 5%, 2,4'-isomer, 2775 g. of epichlorohydrin (30 mols) and 4 g. of sodium acetate are mixed in a suitable reaction flask equipped with a stirrer, thermometer, distillation head and dropping funnel, and refluxed at 115° C. for about 10–15 minutes to a clear solution.

A suspension, of 264 g. of sodium hydroxide (6.6 mols) in flake form, is suspended in about 580 g. of xylene and added to the above refluxing solution with vigorous stirring over a one to two hour period, while distilling off the water of reaction. The sodium chloride by-product precipitates out of solution.

The solution is filtered hot to remove sodium chloride, and the glycidyl ether product crystallizes out on cooling the filtrate. The product is recovered and washed free of epichlorohydrin with cold methanol.

| | |
|---|---|
| Wt. | 950 g. (71% yield). |
| Epoxy equivalent | 184 (calcd. 181). |
| Melting point | 164.5°–166° C. |
| Hydroyzable chlorine | 0.13% (residual). |

EXAMPLE 2

A run is made as in Example 1 using 18 mols of epichlorohydrin. A product having an epoxy equivalent of 185 and 0.26% hydrolyzable chlorine and having a melting point of 164°–165° C. is recovered. Yield, 985 g. (75%).

EXAMPLE 3

Bis(3-methyl-4-glycidyloxyphenyl)sulfone is prepared using bis(3-methyl-4-hydroxyphenyl)sulfone in place of the bis(4-hydroxyphenyl)sulfone of Example 1. The product, isolated in 70% yield, has a melting point of 98° C., an epoxy equivalent of 202 (calcd., 195) and a hydrolyzable chlorine of 0.052%.

We claim:

1. In the process for preparing glycidyl ethers of polyhydric phenols by first refluxing a mixture of a bis(hydroxyphenyl)sulfone and an epihalohydrin in excess epihalohydrin to form the soluble adduct and reacting said adduct with an alkali-metal hydroxide while continuously removing water formed during the reaction, the improvement which comprises adding a catalytic amount of an alkali-metal salt of a carbon containing acid having up to about 4 carbon atoms to the refluxing mixture of bis(hydroxyphenyl)sulfone and epihalohydrin to accelerate formation of said soluble adduct.

2. A process as in claim 1 wherein the epihalohydrin is epichlorohydrin.

3. A process as in claim 1 wherein the polyhydric phenol is substantially bis(4-hydroxyphenyl)sulfone.

4. A process as in claim 1 wherein the alkali metal salt of carbon containing acid is sodium acetate.

5. A process as in claim 1 wherein the alkali metal salt of carbon containing acid is sodium formate.

References Cited
UNITED STATES PATENTS
2,765,322   10/1956   Beavers _____ 260—348 R NORMA S. MILESTONE, Primary Examiner